(12) United States Patent
Merry (10) Patent No.: US 9,968,104 B2
(45) Date of Patent: May 15, 2018

(54) METHOD AND APPARATUS FOR WASHING, SORTING, COUNTING, AND BAGGING SHELLFISH

(71) Applicant: Merry Shellfish Farm LLC, Duxbury, MA (US)

(72) Inventor: Donald Merry, Duxbury, MA (US)

(73) Assignee: Merry Shellfish Farm LLC, Duxbury, MA (US)

( * ) Notice: Subject to any disclaimer, the term of this patent is extended or adjusted under 35 U.S.C. 154(b) by 449 days.

(21) Appl. No.: 14/712,173

(22) Filed: May 14, 2015

(65) Prior Publication Data
US 2015/0327560 A1 Nov. 19, 2015

Related U.S. Application Data

(60) Provisional application No. 61/993,356, filed on May 15, 2014.

(51) Int. Cl.
*A22C 29/00* (2006.01)
*A22C 29/04* (2006.01)

(52) U.S. Cl.
CPC ............ *A22C 29/00* (2013.01); *A22C 29/005* (2013.01); *A22C 29/043* (2013.01)

(58) Field of Classification Search
CPC ......... A22C 20/00; A22C 29/05; A22C 29/02; A22C 29/021–29/028; A22C 29/04; A22C 29/043; A22C 29/046

USPC .................................................. 452/12–20
See application file for complete search history.

(56) References Cited

U.S. PATENT DOCUMENTS

| | | | | |
|---|---|---|---|---|
| 7,179,160 B2* | 2/2007 | Hulin | .................. | A22C 29/005 452/2 |
| 8,109,810 B2* | 2/2012 | Blenkinsopp | .......... | A22C 25/12 452/16 |
| 8,147,298 B2* | 4/2012 | Nolsoe | .................. | A22C 25/14 452/106 |
| 8,647,180 B1* | 2/2014 | LaVecchia | .......... | A22C 29/046 452/13 |

* cited by examiner

*Primary Examiner* — Richard T Price, Jr.
(74) *Attorney, Agent, or Firm* — Kurt Rauschenbach; Rauschenbach Patent Law Group, LLP (57) ABSTRACT

A system for processing shellfish includes an input hopper that receives a batch of shellfish to be processed. A conveyer is positioned to receive shellfish from the input hopper and transports the shellfish through the system. The conveyor defines a plurality of holes that allow cleaning substances to pass through the conveyor. A washing system comprising a least one nozzle that dispenses cleaning substances to the shellfish being transported by the conveyor. An operator station includes at least one container for depositing market-ready shellfish passing along the conveyor. At least one optical sensor is positioned to detect the market-ready shellfish being placed into the at least one container. A counter is electrically connected to the optical sensor and records a number of shellfish being placed in the at least one container. An output hopper is positioned proximate to an end of the conveyor to catch rejected shellfish.

9 Claims, 6 Drawing Sheets

METHOD AND APPARATUS FOR WASHING, SORTING, COUNTING, AND BAGGING SHELLFISH

The section headings used herein are for organizational purposes only and should not to be constructed as limiting the subject matter described in the present application in any way.

CROSS-REFERENCE TO RELATED APPLICATION

This application is a non-provisional application of U.S. Provisional Patent Application Ser. No. 61/993,356 filed May 15, 2014, entitled "Method and Apparatus for Washing, Sorting, Counting, and Bagging Shellfish." The entire disclosure of U.S. Provisional Patent Application Ser. No. 61/993,356 is incorporated herein by reference.

INTRODUCTION

Sorting and preparing market-ready shellfish is a time consuming process with many steps. Shellfish that are grown or harvested and have reached a market-ready state must be separated from those that either need more time to grow or are not suitable for sale. Additionally, the market-ready shellfish must be cleaned, counted, and bagged based on the desired quantities and grades.

Systems have been developed to automate certain process steps, such as sorting, cleaning, and bagging. However, technological and economic limitations of these systems have preserved an important role for human operators, who reduce waste, error, and costs with greater accuracy and adaptability. Effectively automating additional process steps that are still performed by human operators would save more time and energy.

BRIEF DESCRIPTION OF THE DRAWINGS

The present teaching, in accordance with preferred and exemplary embodiments, together with further advantages thereof, is more particularly described in the following detailed description, taken in conjunction with the accompanying drawings. The skilled person in the art will understand that the drawings, described below, are for illustration purposes only. The drawings are not necessarily to scale, emphasis instead generally being placed upon illustrating principles of the teaching. The drawings are not intended to limit the scope of the Applicant's teaching in any way.

DESCRIPTION OF VARIOUS EMBODIMENTS

The present teaching, in accordance with preferred and exemplary embodiments, together with further advantages thereof, is more particularly described in the following detailed description, taken in conjunction with the accompanying drawings. The skilled person in the art will understand that the drawings, described below, are for illustration purposes only. The drawings are not necessarily to scale, emphasis instead generally being placed upon illustrating principles of the teaching. The drawings are not intended to limit the scope of the Applicant's teaching in any way.

Reference in the specification to "one embodiment" or "an embodiment" means that a particular feature, structure, or characteristic described in connection with the embodiment is included in at least one embodiment of the teaching. The appearances of the phrase "in one embodiment" in various places in the specification are not necessarily all referring to the same embodiment.

It should be understood that the individual steps of the methods of the present teaching may be performed in any order and/or simultaneously as long as the teaching remains operable. Furthermore, it should be understood that the apparatus and methods of the present teaching can include any number or all of the described embodiments as long as the teaching remains operable.

The present teaching will now be described in more detail with reference to exemplary embodiments thereof as shown in the accompanying drawings. While the present teaching is described in conjunction with various embodiments and examples, it is not intended that the present teaching be limited to such embodiments. On the contrary, the present teaching encompasses various alternatives, modifications and equivalents, as will be appreciated by those of skill in the art. Those of ordinary skill in the art having access to the teaching herein will recognize additional implementations, modifications, and embodiments, as well as other fields of use, which are within the scope of the present disclosure as described herein.

The present invention provides a method and apparatus for aiding a human operator in the washing, sorting, counting, and bagging process for shellfish and other produce. One feature of the present teaching is that these methods and apparatus save time and energy and improve on many of the limitations of prior art methods and apparatus.

Figure 1:
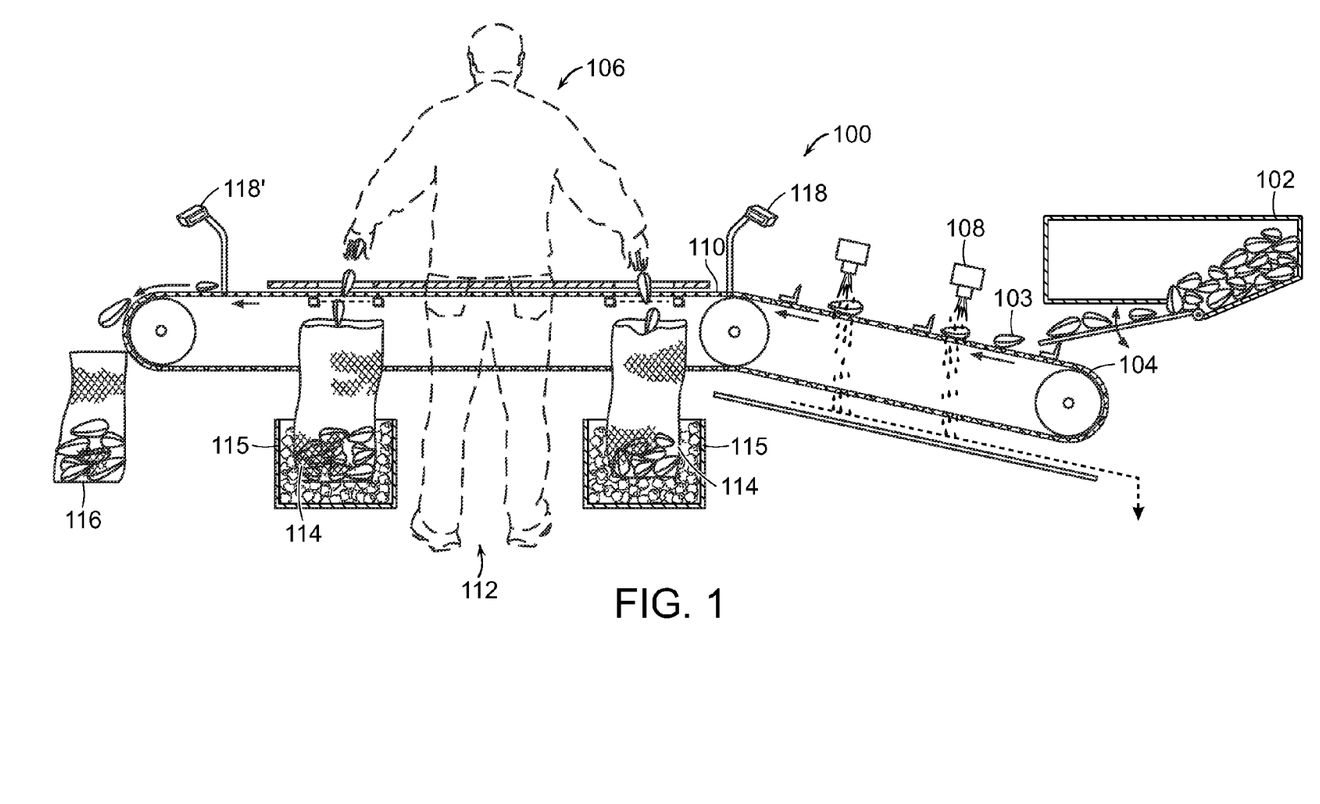
FIG. 1 illustrates a side-view of an embodiment of an apparatus for washing, sorting, and counting shellfish and other produce according to the present teaching.

FIG. 1 illustrates a side-view of an embodiment of an apparatus 100 for washing, sorting, and counting shellfish and other produce according to the present teaching. For example, in one embodiment, the apparatus is designed specifically for washing, sorting, and counting oysters. The apparatus 100 includes a hopper 102 where the shellfish or produce item 103 that is to be to be washed, sorted, and counted is initially deposited. The hopper 102 feeds onto a conveyor belt 104 that carries the shellfish or produce item 103 up an incline to a flat area above the hopper 102. On/off switches can be positioned proximate to the operator 106 so that the operator 106 can easily reach them to turn the conveyor 104 on or off.

The apparatus 100 includes at least one nozzle 108 or other dispenser of liquids, slurries, or other substances that wash the shellfish or produce item 103. The nozzles 108 are positioned above or adjacent to the shellfish 103 being transported by the conveyor 104 so that the shellfish or produce item 103 is exposed to the liquids, slurries, or other substances during its movement up the conveyor 104. In many embodiments of the apparatus of the present teaching, there is a plurality of nozzles 108 that dispense the liquids, slurries, or other substances.

The conveyor 104 includes a flat section 110 above the hopper 102 that continues onwards past operator stations 112 on either side of the conveyor 104. At least one container 114 is positioned proximate to the operator 106 so that the operator 106 can select the market-ready shellfish or produce item 103. In various embodiments, the container 114 is a bag open to receive the market-ready shellfish or produce item 103. Another container 116 is positioned at the end of the conveyor 104 to catch the rejected shellfish or produce item 103 so that it can be returned to the water or other environment for further growth.

One aspect of the apparatus 100 for washing, sorting, and counting shellfish and other produce according to the present teaching is that it greatly reduces the time that oysters and other shellfish are out of the water at elevated temperatures. This aspect is particularly important due to the risk of certain bacterial contaminations that are common in shellfish when left out of the water for even modest amounts of time during warm weather months. For example, vibrio parahaemolyticus (Vp) contamination is particularly prevalent in oysters in some parts of the world. Ingestion of Vp bacteria in raw or undercooked seafood, usually oysters, causes acute gastroenteritis in humans. It is, therefore, very important to minimize the time that oysters are keep at elevated temperatures.

In one embodiment of the apparatus of the present teaching, the containers 114 are immersed in coolers 115 that contain ice slurries. Ice slurries rapidly cool oysters down to temperatures where Vp does not grow. In some embodiments, the time that the oysters are in the ice slurries is recorded and stored. Containers can be tagged so that the recorded times can be associated with certain containers. This helps oyster farmers comply with government regulations to control the post-harvest growth of Vp bacteria in oysters during warm weather to prevent Vp related illnesses.

In addition, the apparatus 100 includes at least one optical sensor 118 that is positioned so that it detect and records each individual shellfish or other produce item being transported on the conveyor 104. In various embodiments, the output of the sensor 118 can be electrically connected to an input of a computer or to a counting apparatus that includes a visual display that records the number of shellfish or other produce items passing in that region of the conveyor 104. Many embodiments of the apparatus of the present teaching include at least one optical sensor 118 before the operating station 112, and at least one optical sensor 118' after optical sensor 118. This configuration will give the operator or manager the number of shellfish or produce items 103 entering into the apparatus, and the number of shellfish or other produce items that are deposited in the container 114 as market-ready shellfish or produce items.

Figures 2, 3:
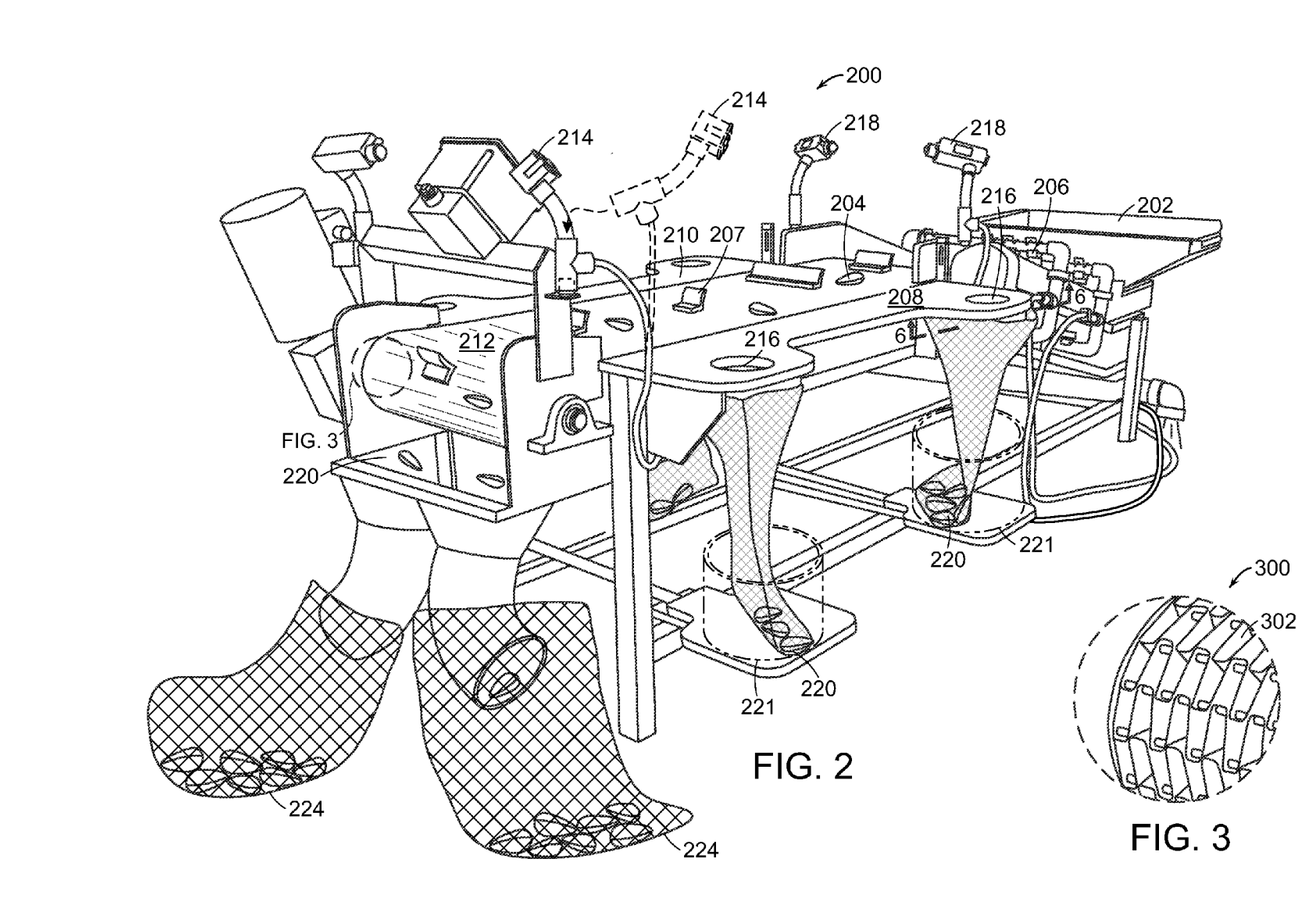
FIG. 2 illustrates a perspective view of an embodiment of an apparatus for washing, sorting, counting, and bagging shellfish.
FIG. 3 illustrates a close-up view of one embodiment of the conveyor according to the present teaching.

FIG. 2 illustrates a perspective view of an embodiment of an apparatus 200 for washing, sorting, and counting shellfish and other produce. The apparatus shown in FIG. 2 is similar to the apparatus 100 that is described in connection with FIG. 1. There is an input hopper 202 for receiving the shellfish and other produce item 204 to be sorted. Also, there is at least one nozzle 206 or other dispenser of liquids, slurries, or other substances that wash the shellfish or other produce item 204.

A conveyor 212 transports the shellfish and other produce item 204 across the apparatus 200. One feature of the conveyor 212 is that it can have holes that allow additional holding fixtures to be secured to the belt in order to keep the shellfish or other produce item 206 in place as it moves along the conveyer 212. In some embodiments, the conveyor 212 secures L-shaped fixtures 207 to the conveyer 212. The L-shaped fixtures 207 are used to transport the shellfish or other produce item 212.

The apparatus 200 shows two operator stations 208, 210 on either side of the conveyor 212. These operator stations 208, 210 have indented or recessed spaces that are close to the conveyor 212, which allows an operator easy access to the shellfish or other produce item 204. In addition, electrical switches 214 are positioned proximate to operator stations 208, 210 so that the operator has access to switches 212 to start or stop the conveyor 212 as necessary.

In addition, the apparatus 200 includes an opening 216 at each side of the operator stations 208, 210 where sorted shellfish or other produce items 204 can pass through to containers 220, which are bags in one embodiment. In some embodiments, optical sensors 218 are positioned proximate to these openings 216 to count the shellfish or other produce items 204 passing through. In various embodiments, the output of the optical sensors 218 can be electrically connected to an input of a computer or counting apparatus that includes a visual display that records the number of shellfish or other produce items 204 passing in that region of the conveyor 212. In various methods of operation, the containers 220 may be filled by the operator to a desired volume of shellfish or produce items. The operator may also full the containers 220 to a desired number of shellfish or other produce items 204. The operators may remove the containers 220 to another location and then insert a new container 220, such as a bag, beneath the openings 216. Any mechanical or electrical counters can be reset before, during, and/or after this process. In many embodiments, the container 220 is placed in a cooler 221 that contains an ice slurry that maintains the shellfish at a temperature where dangerous bacteria do not grow.

As shown in the apparatus 200 of FIG. 2, the conveyor 212 continues past the operator stations 208, 210. A second or output hopper 222 is positioned past the operator stations 208, 210 to provide for further processing steps. A container or plurality of containers 224 is positioned past the operators to collect the sorted shellfish or produce items 204. In some methods of operation, the operator will leave shellfish or other produce items that have not reached a sufficient size or other metric on the conveyer 212, where they will be collected in the containers 224 and returned to the water (or other environment) for further growth.

In one specific embodiment of the apparatus of the present teaching, the apparatus is roughly twelve feet long and four feet wide, and is built from marine-grade aluminum and stainless steel. The apparatus can be built at an incline, with the input hopper 202 at the lower end.

One advantage of the methods and apparatus of the present teaching is that the shellfish or other produce items 204 are conveniently presented in front of the operator when standing at the indented spaces or stations 208, 210. Another advantage of the present teaching is that when the shellfish or other produce items 204 are presented to the operator, they are already cleaned. Because the shellfish or other produce items 204 are in front of the operator, and because the produce is clean, the operator can select only produce that is market ready, passing it through the opening 216 in a single step. This, and the fact that the operators do not have to count the produce, saves considerable time.

Another advantage of the methods and apparatus of the present teaching is that there is significant time and cost saved by combining the steps of washing, sorting, and counting into a single apparatus. Operators of prior art apparatus must clean shellfish or other produce items 204 before they can be sorted. Prior art apparatus do not support an operator pulling off the desired shellfish and leaving the undesired ones on the conveyor for further processing or return to water. Furthermore, operators of the apparatus of the present teaching do not count individual shellfish deposited through the openings to the containers, saving operator time and minimizing counting errors. It has been shown that between three and four hours of operator time per day can be saved with the apparatus of the present teaching.

In one method of operation, bulk shellfish, such as bulk oysters, are loaded into the input hopper 202. From the input hopper 202, they pass through a feeding tray and are fed onto the conveyor 212, which brings the shellfish or other produce item 204 up a slight incline, moving it through a washing system that typically includes a plurality of nozzles 206. In the embodiment shown in FIG. 2, the plurality of nozzles 206 are positioned at the beginning of the conveyer 212. In some methods, friction holds the shellfish or other produce item 204 in place as it progresses along the conveyor 212. In other methods, the shellfish or other produce item 204 is prevented from moving relative to the conveyor 212 by fixtures, such as the L-shaped fixtures 207 attached to the conveyor 212.

The conveyor 212 moves up to a convenient table height such as 36", where there are two operator stations 208, 210—one on either side of the conveyor 212. Each of the operator stations 208, 210 has an indented or recessed space for an operator to stand, and two openings 216 (one on the left and one on the right) through which the operator passes the shellfish or other produce item 204. The openings 216 can be, for example, approximately four inches in diameter.

The operator pulls market-sized shellfish or other produce item 204 off the conveyer 212 and through the openings 216 into market ready containers 220 that are affixed beneath the openings 216. Each opening 216 is fitted with one or more optical sensors 218, which count the shellfish or other produce item 204 as it passes through. The number of shellfish or other produce items 204 can be displayed on a digital display, and when the desired number is reached, the operator closes the bag and removes it out from under the station, where it is then moved into a refrigerator for shipment.

After a filled container 220 is removed, another container is placed under the opening 216 and the counter is reset and ready to start again. There are typically electrical on/off switches 214 positioned within reach of each operator so that the apparatus 200 is easily paused between container changes if necessary. The shellfish or other produce items 204 that are not ready for market continue on the conveyor 212 past the operators, and either drop into crates or containers 224, such as grow-out bags, to be returned to the water or other environment for additional growth.

FIG. 3 illustrates a close-up view of one embodiment of the conveyor 300 according to the present teaching. One feature of the conveyor 300 of the present teaching shown in FIG. 3 is that, in one embodiment, conveyor 300 has holes 302 to allow water or other cleaning substance from the at least one nozzle 206 (see FIG. 2) used in the washing step to pass through the conveyor 300. In some embodiments, the conveyor 300 is formed of marine-grade steel so that it is highly corrosion resistant. In one particular embodiment, the conveyor 300 is segmented to allow it to pass around transport rollers that are positioned at the two ends of the apparatus and, in some embodiments, at other locations along the conveyor 300.

Figure 4:
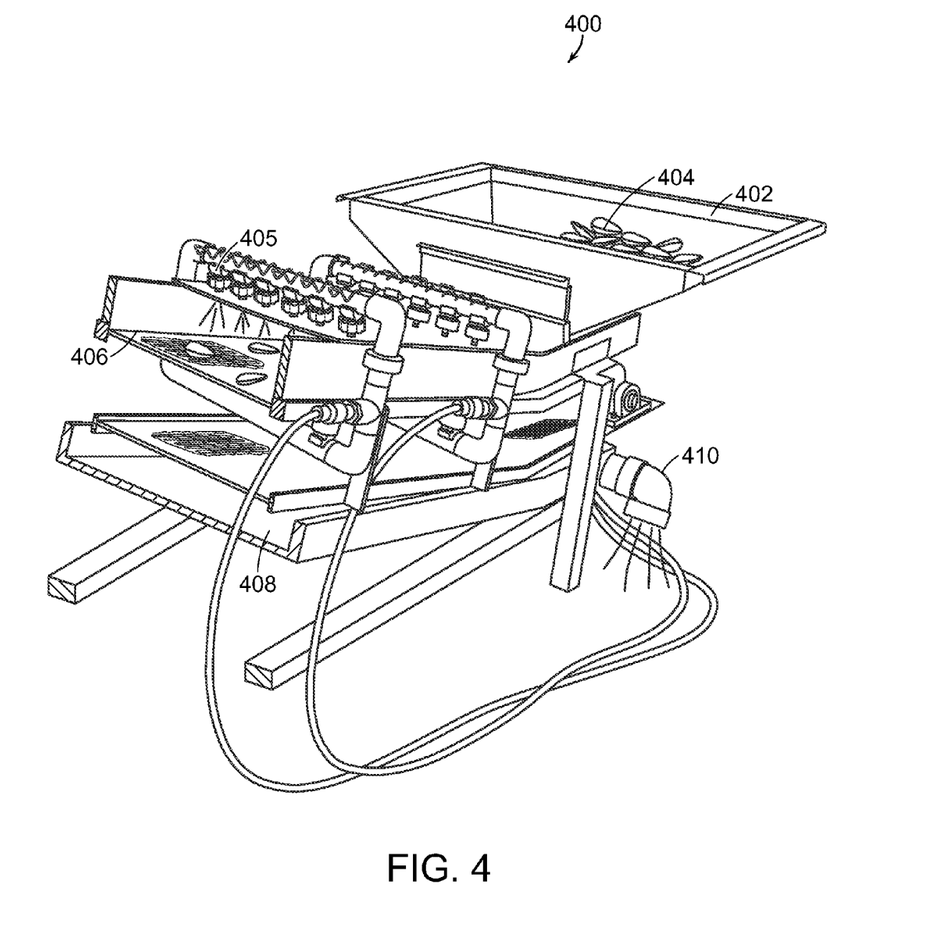
FIG. 4 illustrates an embodiment of an input hopper and washing apparatus of the present teaching.

FIG. 4 illustrates an embodiment of an input hopper and washing apparatus 400 of the present teaching. The input hopper 402 is a bin large enough to hold a batch of the shellfish or other produce items 404. The washing apparatus 400 includes multiple nozzles 405 that are positioned across and above the conveyor 406. In the particular embodiment shown in FIG. 4, there is a plurality of nozzles 405 that is positioned across and above the conveyor in such a way as to spray the shellfish or other produce items 404 from different angles. In the embodiment shown in FIG. 4, the washing apparatus include two stages, each with a plurality of nozzles positioned across and above the conveyor 406 in such a way as to spray the washing apparatus from different angles. For example, each of the two stages can include 5-10 nozzles 405. In some methods, the liquid is water.

FIG. 4 also illustrates a collection system 408 for the washing fluid or material. The collection system 408 channels the liquid or other substance that passes through the conveyor 406 to a conduit or pipe 410 that passes the used liquid or other substance to a removal or reclamation system.

Figure 5:
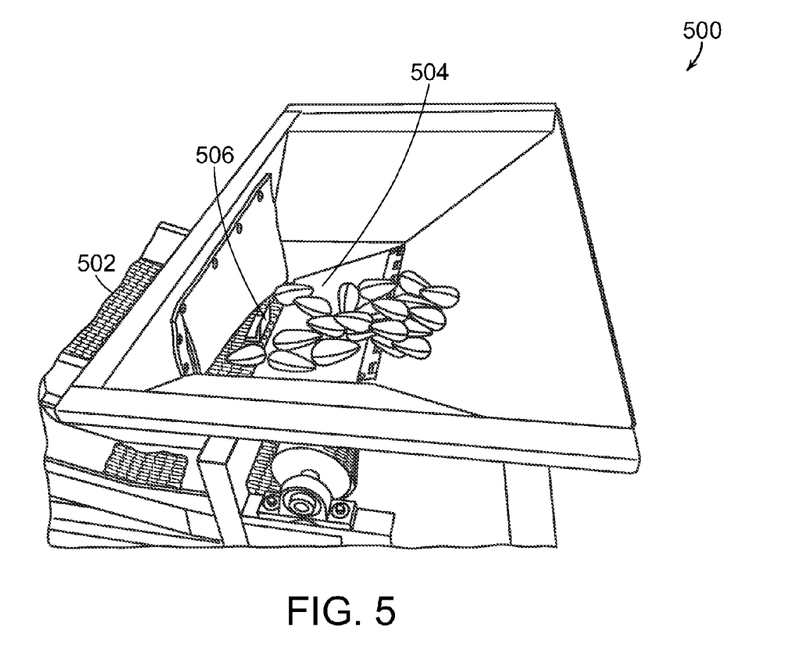
FIG. 5 illustrates an embodiment of an input hopper for feeding bulk shellfish or produce items onto a conveyor according to the present teaching.

FIG. 5 illustrates an embodiment of an input hopper 500 for feeding bulk shellfish or produce items onto a conveyor 502 according to the present teaching. In some embodiments, the hopper 500 is manufactured from marine-grade steel. Also, in some embodiments, the hopper 500 is a gravity feed hopper that is posited above the conveyor 502. Gravity helps to feed the bulk shellfish or other produce items directly onto the conveyor 502.

The hopper 500 includes a feeding tray 504 that is attached to an outlet toward the bottom of the hopper 500. The hopper 500 shown in FIG. 4 also includes L-shaped elements 506 attached to the conveyor 502 that pass under the hopper 500. As shown in FIG. 1, these L-shaped elements 506 attached to the conveyor 502 cause the feeding tray 504 attached near the bottom of the hopper to move up and down as the L-shaped elements pass underneath. This up and down action causes the shellfish or other produce item to move from the hopper 500 to the conveyer 502 in a controlled manner, thereby controlling the number of shellfish or produce items that move from the hopper 500 to the conveyer 502.

Figure 6:
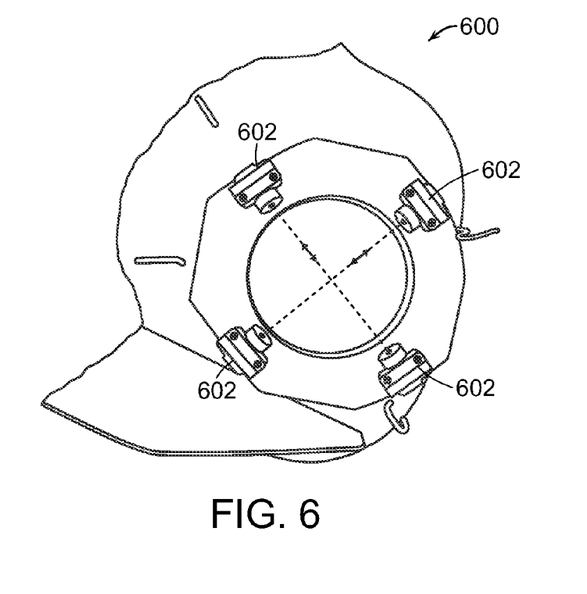
FIG. 6 illustrates an embodiment of an optical sensor system for counting shellfish or other produce items according to the present teaching.

FIG. 6 illustrates an embodiment of an optical sensor system 600 for counting shellfish or other produce items according to the present teaching. The optical sensor system 600 has four sensors 602 that are positioned uniformly around the edge of the opening 216 (see FIG. 2) through which the market-ready shellfish or produce items pass. In some embodiments, the optical sensors are electronic eyes (electro-optic sensor), which pass light from a light transmitter to a receiver sensor directly across from it in a line-of-sight as illustrated in FIG. 6. When the shellfish or other produce item passes through an optical sensor's line-of-sight, the light generated by the sensor is blocked and a count is registered in the sensor system. In various other embodiments, numerous other different sensor systems may be used for counting.

Figure 7:
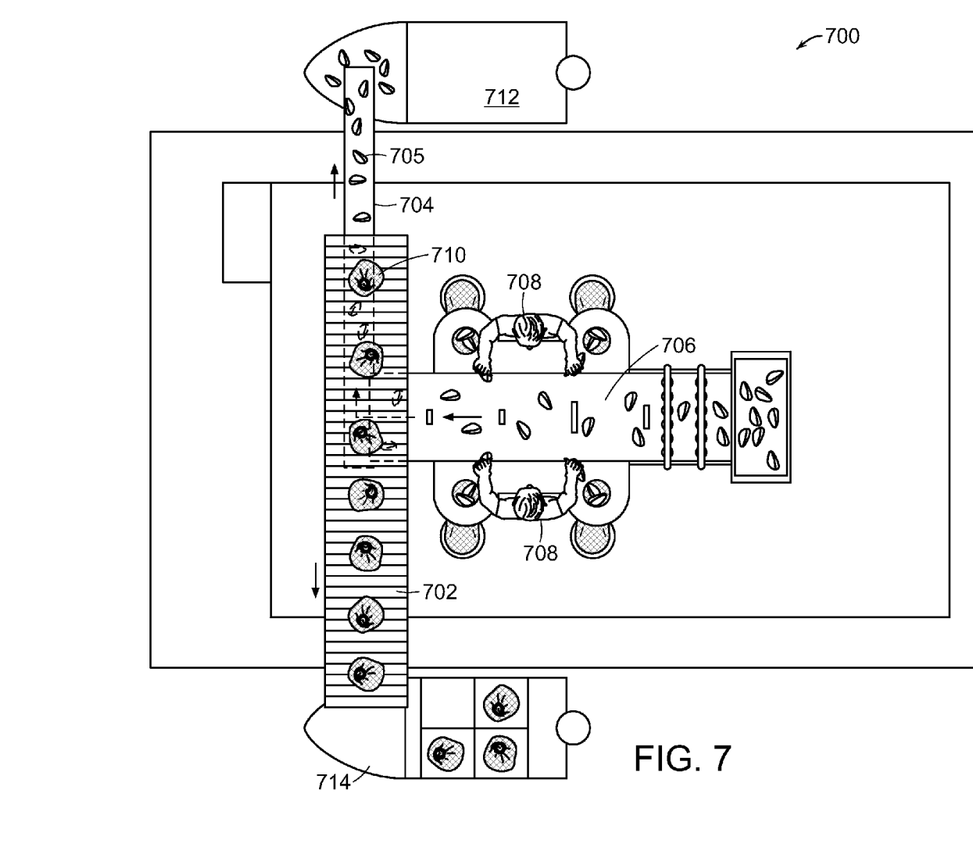
FIG. 7 illustrates a top-view of an embodiment of an apparatus for washing, sorting, counting, and bagging shellfish that includes a second conveyor for transporting the containers of market-ready shellfish and a third conveyor for transporting rejected shellfish back to a boat so that they can be returned to the water.

FIG. 7 illustrates a top-view of an embodiment of an apparatus 700 for washing, sorting, counting, and bagging shellfish that includes a second conveyor 702 for transporting the containers of market-ready shellfish, and a third conveyor 704 for transporting rejected shellfish 705 back to a boat 712 so that they can be returned to the water. The top-view of the apparatus 700 is similar to the apparatus 200 described in connection with FIG. 2. The second conveyor 702 is positioned at the top level adjacent to the conveyor 706 that is used for washing and sorting, which is similar to the conveyor 212 shown in FIG. 2. In various embodiments, the second conveyor 702 can be powered by driving rollers with an electric motor, or can be passive and include only unpowered rollers that make it easy for the operators 708 to transport containers of market-ready shellfish 710 to a vehicle, such as a boat 714 or truck.

The third conveyor 704 is positioned under the second conveyor 702 adjacent to the end of the conveyor 706. The third conveyor 704 transports the shellfish to a vehicle, such as a boat 714, so that they can be returned to the water. In various embodiments, the third conveyor 704 can transport the shellfish individually as shown in FIG. 7 or can transport the shellfish in containers, such as bags.

Figure 8:
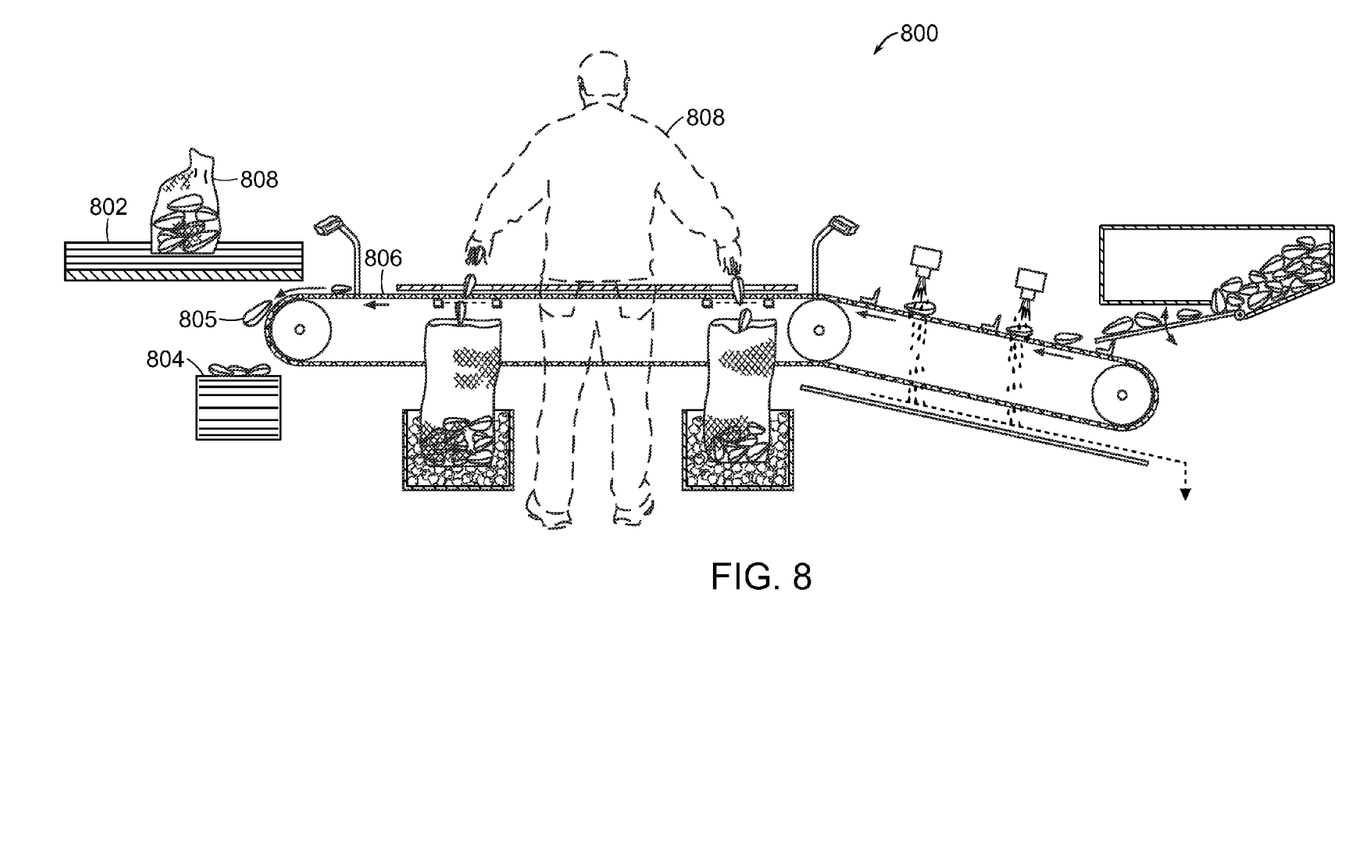
FIG. 8 illustrates a side-view of an embodiment of an apparatus for washing, sorting, counting, and bagging shellfish that includes a second conveyor for transporting the containers of market-ready shellfish and a third conveyor for transporting rejected shellfish back to a boat so that they can be returned to the water.

FIG. 8 illustrates a side-view of an embodiment of an apparatus 800 for washing, sorting, counting and bagging shellfish that includes a second conveyor 802 for transporting the containers of market-ready shellfish and a third conveyor 804 for transporting rejected shellfish 805 back to a boat so that they can be returned to the water. The side-view of the apparatus 800 is similar to the apparatus 100 shown in connection with FIG. 1. The second conveyor 802 is positioned at the top level adjacent to the conveyor 806 that is used for washing and sorting, which is similar to the conveyor 212 shown in FIG. 2. As described in connection with the apparatus 700 of FIG. 7, in various embodiments, the second conveyor 802 can be powered by driving rollers with an electric motor or can be passive and include only unpowered rollers that make it easy for the operators 808 to transport containers of market-ready shellfish 808 to a vehicle, such as a boat or truck.

The third conveyor 804 is positioned under the second conveyor 802 adjacent to the end of the conveyor 806. The third conveyor 804 transports the rejected shellfish to a vehicle, such as a boat, so that they can be returned to the water. In various embodiments, the third conveyor 804 can transport the shellfish individually as shown in FIG. 8 or can transport the shellfish in containers, such as bags.

EQUIVALENTS

While the Applicant's teaching is described in conjunction with various embodiments, it is not intended that the Applicant's teaching be limited to such embodiments. On the contrary, the Applicants' teaching encompasses various alternatives, modifications, and equivalents, as will be appreciated by those of skill in the art, which may be made therein without departing from the spirit and scope of the teaching.

What is claimed is:

1. A system for processing shellfish, the system comprising:
   a) an input hopper that receives a batch of shellfish to be processed;
   b) a conveyer that is positioned to receive shellfish from the input hopper and that transports the shellfish, the conveyor defining a plurality of holes that allows cleaning substances to pass through the conveyor;
   c) a washing system comprises at least one nozzle that dispenses cleaning substances to the shellfish being transported by the conveyor;
   d) an operator station comprising at least one container for depositing market-ready shellfish passing along the conveyor;
   e) at least one optical sensor positioned to detect the market-ready shellfish being placed into the at least one container;
   f) a counter that is electrically connected to the optical sensor that records a number of shellfish being placed in the at least one container;
   g) a second conveyor positioned adjacent to the conveyer that transports the market-ready shellfish; and
   h) a third conveyor positioned adjacent to the conveyer that transports the rejected shellfish.

2. The system for processing shellfish of claim 1 wherein the shellfish comprises oysters.

3. The system for processing shellfish of claim 1 wherein the conveyor comprises a plurality of holding fixtures.

4. The system for processing shellfish of claim 3 wherein at least some of the plurality of holding fixtures comprises L-shaped holding fixtures.

5. The system for processing shellfish of claim 1 further comprising a feeding tray that passes the shellfish from the input hopper to the conveyor.

6. The system for processing shellfish of claim 1 wherein the cleaning substance comprises water.

7. The system for processing shellfish of claim 1 wherein the conveyor is segmented to allow it to pass around transport rollers that are positioned at ends of the apparatus.

8. The system for processing shellfish of claim 1 wherein the at least one nozzle comprises a plurality of nozzles that is positioned above the conveyor to spray the shellfish from different angles.

9. The system for processing shellfish of claim 1 wherein the at least one container for depositing market-ready shellfish passing along the conveyor is positioned in a cooler that controls the temperature of the shellfish to slow growth of dangerous bacteria.

\* \* \* \* \*